(12) United States Patent
Matsumoto (10) Patent No.: US 12,530,231 B2
(45) Date of Patent: Jan. 20, 2026

(54) PARALLEL AND DISTRIBUTED COMPUTING SYSTEM

(71) Applicants: INFORMATION SCIENCE LABORATORY, LTD., Niigata (JP); NIS PLUS CO., LTD., Tokyo (JP)

(72) Inventor: Takashi Matsumoto, Nara (JP)

(73) Assignee: INFORMATION SCIENCE LABORATORY, LTD. / NIS PLUS CO., LTD. (JP)

( * ) Notice: Subject to any disclaimer, the term of this patent is extended or adjusted under 35 U.S.C. 154(b) by 516 days.

(21) Appl. No.: 18/009,902

(22) PCT Filed: Jun. 11, 2021

(86) PCT No.: PCT/JP2021/022268
§ 371 (c)(1),
(2) Date: Dec. 12, 2022

(87) PCT Pub. No.: WO2021/251479
PCT Pub. Date: Dec. 16, 2021

(65) Prior Publication Data
US 2023/0229500 A1 Jul. 20, 2023

(30) Foreign Application Priority Data
Jun. 12, 2020 (JP) ................................. 2020-102484

(51) Int. Cl.
*G06F 9/50* (2006.01)
(52) U.S. Cl.
CPC .......... *G06F 9/5016* (2013.01); *G06F 9/5072* (2013.01)
(58) Field of Classification Search
CPC ..... G06F 9/5016; G06F 9/5072; G06F 15/173
See application file for complete search history.

(56) References Cited

U.S. PATENT DOCUMENTS

| 5,961,606 A | 10/1999 | Talluri et al. |
| 2017/0054633 A1 | 2/2017 | Underwood et al. |

(Continued)

FOREIGN PATENT DOCUMENTS

| JP | 2010-510590 A | 4/2010 |
| JP | 2014-191497 A | 10/2014 |
| WO | WO2008/064139 A | 5/2008 |

OTHER PUBLICATIONS

Matsumoto "A Study on Memory-Based Communications and Synchronization in Distributed-Memory Systems," Oct. 15, 2001 (Year: 2001).*

(Continued)

*Primary Examiner* — Sisley N Kim
(74) *Attorney, Agent, or Firm* — Brooks Kushman P.C.

(57) ABSTRACT

The present invention is to solve the breaking of memory consistency caused by disturbance of packet arrival order in an environment in which a plurality of computers are interconnected via a plurality of data links and the plurality of computers perform communication synchronization by MBCF with each other. A transmission-side process includes a transmission number-counting unit that counts the number of transmission of the operation request packet for each reception-side process and attaches a count number before or after counting-up of the operation request packet to the operation request packet, a reception-side process includes a reception number-counting unit that counts the number of reception of the operation request packet for each transmission-side process, and a transmission destination computer performs processing of the operation request packet when a count number of the reception number-counting unit and the count number attached to the operation request packet are consecutive.

4 Claims, 11 Drawing Sheets

(56) References Cited

U.S. PATENT DOCUMENTS

2018/0317236 A1* 11/2018 Yang .................. H04L 47/28
2021/0385166 A1* 12/2021 Xia ..................... H04L 47/22

OTHER PUBLICATIONS

Matsumoto, T. "A Study on Memory-Based Communications and Synchronization in Distributed-Memory Systems" Dissertation Thesis, Graduate School of Science, Univ. of Tokyo, Feb. 2001.

International Search Report dated Aug. 31, 2021 issued for International application No. PCT/JP2021/022268.

Matsumoto, Takashi, "Evaluation of the Memory-Based Communication Facility" IEICE Technical Report, Sep. 27, 2021, vol. 101, No. 329, pp. 31-40.

Matsumoto, Takashi et al., "General-Purpose Massively-Parallel Operating System: SSS-CORE", IPSJ SIG technical reports, Aug. 27, 1996, vol. 96, No. 79, pp. 115-120.

Niwa, Junpei, "Compiling Techniques for ADSM on General-Purpose Massively-Parallel Operating System: SSS-CORE", Computer Software, May 15, 1998, vol. 15, No. 3, pp. 242-246.

Matsumoto, Takashi, "Evaluation of the Memory-Based Communication Facility" IEICE Technical Report, Sep. 27, 2001, vol. 101, No. 329, pp. 31-40.

EESR dated Jul. 9, 2024 issued in EP patent application No. 21822815.3.

Takashi Matsumoto et al: "MBCF: A Protected and Virtualized High-Speed User-Level Memory-Based Communication Facility", Conference Proceedings of The 1998 International Conference on Supercomputing. Melbourne, Australia, Jul. 13-17, 1998; [ACM International Conference on Supercomputing], New York, NY : ACM, US, Jul. 13, 1998, pp. 259-266.

* cited by examiner

| TRANSMISSION NUMBER COUNT | MULTI-LINK SYNCHRONIZATION INFORMATION | COMMAND | TARGET ADDRESS | SIZE (NUMBER OF BYTES) | DATA SEQUENCE |
|---|---|---|---|---|---|
| 1 | — | MBCF_WRITE | ADDRESS OF A1 | N | $a_1 d_1,...$ |
| 2 | — | MBCF_WRITE | ADDRESS OF B1 | N | $b_1 d_1,...$ |
| 3 | — | MBCF_WRITE | ADDRESS OF C1 | N | $c_1 d_1,...$ |
| 4 | 3 | MBCF_WRITE | ADDRESS OF F1 | 4 | 1 |
| 5 | — | MBCF_WRITE | ADDRESS OF A2 | N | $a_2 d_1,...$ |
| 6 | — | MBCF_WRITE | ADDRESS OF B2 | N | $b_2 d_1,...$ |
| 7 | — | MBCF_WRITE | ADDRESS OF C2 | N | $c_2 d_1,...$ |
| 8 | 7 | MBCF_WRITE | ADDRESS OF F2 | 4 | 1 |
| 9 | — | MBCF_WRITE | ADDRESS OF A3 | N | $a_3 d_1,...$ |
| 10 | — | MBCF_WRITE | ADDRESS OF B3 | N | $b_3 d_1,...$ |
| 11 | — | MBCF_WRITE | ADDRESS OF C3 | N | $c_3 d_1,...$ |
| 12 | 11 | MBCF_WRITE | ADDRESS OF F3 | 4 | 1 |

FIG.10

| TRANSMISSION NUMBER COUNT | MULTI-LINK SYNCHRONIZATION INFORMATION | COMMAND | TARGET ADDRESS | SIZE (NUMBER OF BYTES) | DATA SEQUENCE |
| --- | --- | --- | --- | --- | --- |
| 1 | —— | MBCF_WRITE | ADDRESS OF A1 | N | $a_1d_1,...$ |
| 2 | —— | MBCF_WRITE | ADDRESS OF A2 | N | $a_2d_1,...$ |
| 3 | —— | MBCF_WRITE | ADDRESS OF A3 | N | $a_3d_1,...$ |
| 4 | —— | MBCF_WRITE | ADDRESS OF B1 | N | $b_1d_1,...$ |
| 5 | —— | MBCF_WRITE | ADDRESS OF B2 | N | $b_2d_1,...$ |
| 6 | —— | MBCF_WRITE | ADDRESS OF B3 | N | $b_3d_1,...$ |
| 7 | —— | MBCF_WRITE | ADDRESS OF C1 | N | $c_1d_1,...$ |
| 8 | —— | MBCF_WRITE | ADDRESS OF C2 | N | $c_2d_1,...$ |
| 9 | —— | MBCF_WRITE | ADDRESS OF C3 | N | $c_3d_1,...$ |
| 10 | 7 | MBCF_WRITE | ADDRESS OF F1 | 4 | 1 |
| 11 | 8 | MBCF_WRITE | ADDRESS OF F2 | 4 | 1 |
| 12 | 9 | MBCF_WRITE | ADDRESS OF F3 | 4 | 1 |

FIG.11

PARALLEL AND DISTRIBUTED COMPUTING SYSTEM

CROSS-REFERENCE TO RELATED APPLICATIONS

This application is the U.S. National phase of PCT Application No. PCT/JP2021/022268, filed Jun. 11, 2021, which claims priority to Japanese Patent Application No. 2020-102484, filed Jun. 12, 2020, the disclosures of which are incorporated in their entirety by reference herein.

TECHNICAL FIELD

The present invention relates to a parallel and distributed computing system in which a plurality of computers including a processor including a translation lookaside buffer (TLB), a physical memory, and a network interface controller (NIC) directly accessible to the physical memory are interconnected via a plurality of data links

BACKGROUND ART

As described in Non Patent Literature 1, the inventors of the present application have been developing a memory-based communication facility (MBCF) of a communication and/or synchronization mechanism based on a memory-based communication and/or synchronization scheme. This MBCF is a mechanism that does not require any special communication and/or synchronization hardware but uses a stock network interface card (NIC) to implement high-speed high-performance communication and/or synchronization with remote memory operation only by software.

CITATION LIST

Non Patent Literature

Non Patent Literature 1: MATSUMOTO, Takashi: A Study on Memory-Based Communications and Synchronization in Distributed-Memory Systems. Dissertation Thesis, Graduate School of Science, Univ. of Tokyo (February 2001).

SUMMARY OF INVENTION

Technical Problem

Specifically, the MBCF is configured using a computer including a processor including a translation lookaside buffer (TLB), a physical memory, and a network interface controller (NIC) directly accessible to the physical memory. For example, a process of a transmission source computer (hereinafter, a transmission-side process) transmits an operation request packet including an identifier of an operation target process (hereinafter, a reception-side process) that specifies a process of a transmission destination computer, an operation target address that specifies a memory area of the reception-side process, a data size to be written, and a data sequence Then, the transmission destination computer receives the operation request packet transmitted by the transmission-side process, and stores the data sequence in the memory area specified by the reception-side process and the operation target address.

Meanwhile, the inventors of the present application consider configuring a parallel and distributed computing system (combined by link aggregation) in which a plurality of computers are interconnected via a plurality of data links At this time, it is assumed that there is a plurality of data links in each node (computer), and since there is a plurality of data links, there is a problem that the arrival order of remote memory operation request packets is disturbed and the memory consistency is broken by load distribution of the packets to the plurality of links.

Therefore, the present invention has been made to solve the above problems, and a main object of the present invention is to maintain memory consistency in a situation where there is a disturbance in the arrival order of packets in a parallel and distributed computing system in which a plurality of computers including a processor including a translation lookaside buffer (TLB), a physical memory, and a network interface controller (NIC) directly accessible to the physical memory are interconnected via a plurality of data links.

Solution to Problem

A parallel and distributed computing system according to the present invention is a parallel and distributed computing system in which a plurality of computers including a processor including a translation lookaside buffer (TLB), a physical memory, and a network interface controller (NIC) directly accessible to the physical memory are interconnected via a plurality of data links, wherein a process of a transmission source computer (hereinafter, a transmission-side process) transmits an operation request packet including an identifier of an operation target process (hereinafter, a reception-side process) that specifies a process of a transmission destination computer, an operation target address that specifies a memory area of the reception-side process, a data size to be written, and a data sequence, the transmission destination computer receives the operation request packet and stores the data sequence in the memory area specified by the reception-side process and the operation target address, the transmission-side process includes a transmission number-counting unit that counts the number of transmission of the operation request packet for each reception-side process and attaches a count number before or after counting-up of the operation request packet to the operation request packet, the reception-side process includes a reception number-counting unit that counts the number of reception of the operation request packet for each transmission-side process, and the transmission destination computer performs processing of the operation request packet when a count number of the reception number-counting unit and the count number attached to the operation request packet are consecutive and updates the count number of the reception number-counting unit by the count number attached to the operation request packet.

According to such a parallel and distributed computing system, in the parallel and distributed computing system in which a plurality of computers are interconnected via a plurality of data links, and the plurality of computers perform communication and/or synchronization by MBCF with each other, a transmission-side process includes a transmission number-counting unit that attaches a count number before or after counting-up of an operation request packet to the operation request packet, a reception-side process includes a reception number-counting unit that counts the number of reception of the operation request packet for each transmission-side process, and a transmission destination computer performs processing of the operation request packet when a count number of the reception number-counting unit and the count number attached to the operation request packet are consecutive, and updates the count number of the reception number-counting unit by the count number attached to the operation request packet, so that it is possible to resolve a disturbance in arrival order of the operation request packet as necessary.

As a specific processing mode in a case where there is an unarrived operation request packet, in a case where an arrival order at the reception-side process is disturbed and there is an unarrived operation request packet, the transmission destination computer updates the count number by the reception number-counting unit only before the unarrived operation request packet, performs processing of the operation request packet with respect to arrival of an operation request packet after the unarrived operation request packet, and records a count number attached to the operation request packet separately from the reception number-counting unit in an arrived count recording unit.

As a specific processing mode after arrival of the unarrived operation request packet, in a case where a recorded content of arrival record at the reception-side process is consecutive from the reception number-counting unit by using the arrived count recording unit due to arrival of the unarrived operation request packet, the transmission destination computer updates the reception number-counting unit within a consecutive range, and deletes an updated record from the arrived count recording unit.

In order to guarantee the processing order of the operation request packet, the transmission-side process transmits an intention to prohibit the operation request packet to be transmitted by the transmission-side process from being operated until processing of an operation request packet preceding the operation request packet to be transmitted is completed, and adds a transmission number count of the preceding operation request packet whose operation is desired to be reliably ended to the operation request packet as the multi-link synchronization information.

As a specific processing mode of the operation request packet for guaranteeing the processing order of the operation request packet, in a case where the operation request packet to which the multi-link synchronization information is added is received, the transmission destination computer refers to the reception number-counting unit of the reception-side process, performs processing of the operation request packet when a count number described in the multi-link synchronization information is equal to or less than the count number of the reception number-counting unit, and performs updating work of the reception number-counting unit and the arrived count recording unit.

As a specific processing mode of the operation request packet for guaranteeing the processing order of the operation request packet, in a case where the operation request packet to which the multi-link synchronization information is added is received, the transmission destination computer refers to the reception number-counting unit of the reception-side process, delays processing of the operation request packet until the count number of the reception number-counting unit increases and becomes equal to or larger than the count number described in the multi-link synchronization information when the count number described in the multi-link synchronization information is larger than the count number of the reception number-counting unit, and also delays the updating work of the reception number-counting unit and the arrived count recording unit.

Advantageous Effects of Invention

According to the present invention configured as described above, in a parallel and distributed computing system in which a plurality of computers are interconnected via a plurality of data links and the plurality of computers perform communication and/or synchronization by MBCF with each other, it is possible to achieve memory consistency at low cost in a situation where there is a disturbance in the arrival order of packets.

REFERENCE SIGNS LIST 100 parallel and distributed computing system
2 computer
2X transmission source computer
2Y transmission destination computer
21 processor
22 physical memory
23 network interface controller (NIC)
3 data link
201 transmission number-counting unit
202 reception number-counting unit
203 arrived count recording unit

DESCRIPTION OF EMBODIMENT

Hereinafter, a parallel and distributed computing system 100 according to an embodiment of the present invention will be described with reference to the drawings.

Figure 1:
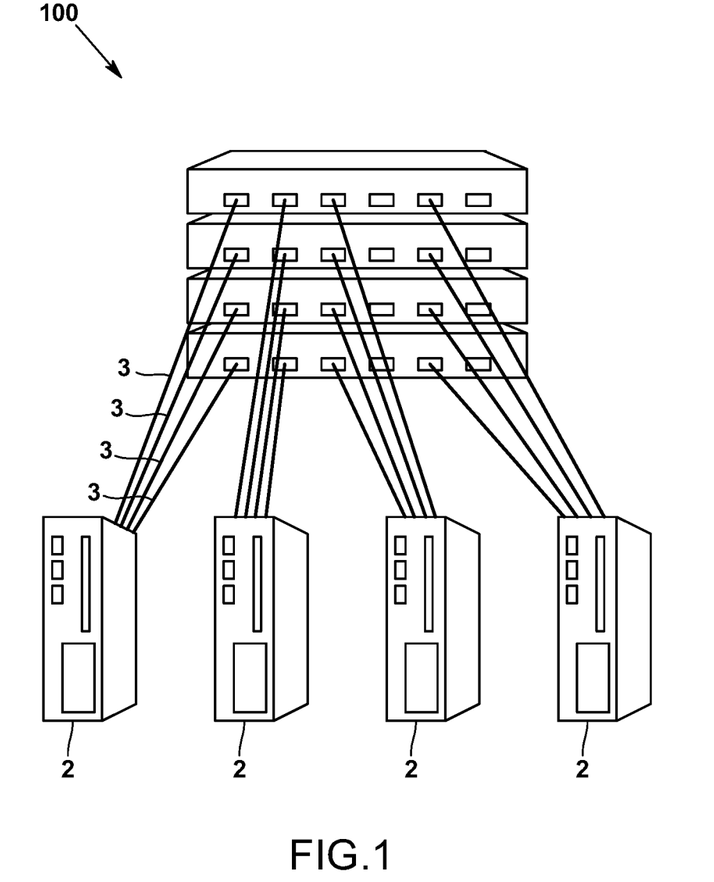
FIG. 1 is a diagram schematically illustrating an overall configuration of a parallel and distributed computing system according to an embodiment of the present invention.

As illustrated in FIG. 1, a parallel and distributed computing system 100 of the present embodiment is obtained by connecting a plurality of computers 2 to each other via a plurality of data links 3 By connecting the plurality of computers 2 to each other via the plurality of data links 3, the parallel and distributed computing system combined by link aggregation is configured.

Figure 2:
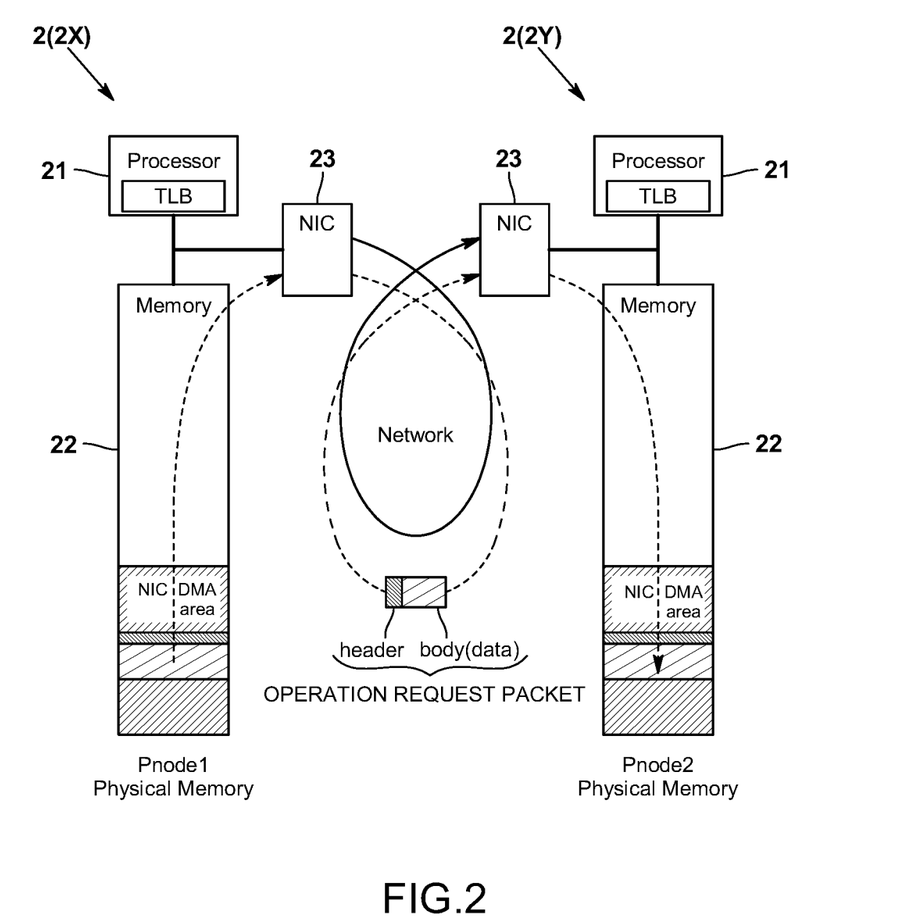
FIG. 2 is a schematic diagram illustrating physical configurations of a transmission source computer and a transmission destination computer according to the embodiment.

As illustrated in FIG. 2, each of the computers 2 includes a processor 21 including a translation lookaside buffer (TLB), a physical memory 22, and a network interface controller (NIC; network interface card) 23 directly accessible to the physical memory 22.

And the parallel and distributed computing system 100 does not require any special communication and/or synchronization hardware but uses a stock network interface card (NIC) 23 to construct a memory-based communication facility (MBCF) to implement high-speed high-performance communication and/or synchronization by remote memory operation only by software. Specifically, the parallel and distributed computing system 100 constructs a memory-based communication facility (MBCF) by an operating system (OS) stored in a kernel space of each computer 2.

The parallel and distributed computing system 100 has variations of various operation commands such as a write command (MBCF_WRITE) for performing remote memory writing and a read command (MBCF_READ) for performing remote memory reading described below.

For example, a process of a transmission source computer 2 (2X) (hereinafter, a transmission-side process) transmits an operation request packet including an identifier of an operation target process (hereinafter, a reception-side process) that specifies a process of a transmission destination computer 2 (2Y), an operation target address that specifies a memory area of the reception-side process, a data size to be written, and a data sequence, and the transmission destination computer 2 receives the operation request packet and stores the data sequence in the memory area specified by the reception-side process and the operation target address (MBCF_WRITE).

In addition, the transmission-side process transmits an operation request packet including an identifier of an operation target process (hereinafter, a reception-side process) that specifies a process of the transmission destination computer 2 (2Y), an operation target address that specifies a memory area of the reception-side process, a data size to be read, and a data storage area address of the transmission-side process, and the transmission destination computer 2 (2Y) receives the operation request packet, reads a data sequence from the memory area specified by the reception-side process and the operation target address, and returns the data sequence to the data storage area of the transmission-side process (MBCF_READ).

Here, the procedure of MBCF_WRITE will be described in detail with reference to FIGS. 3 to 6. The basic procedure is common to other commands.

Figure 3:
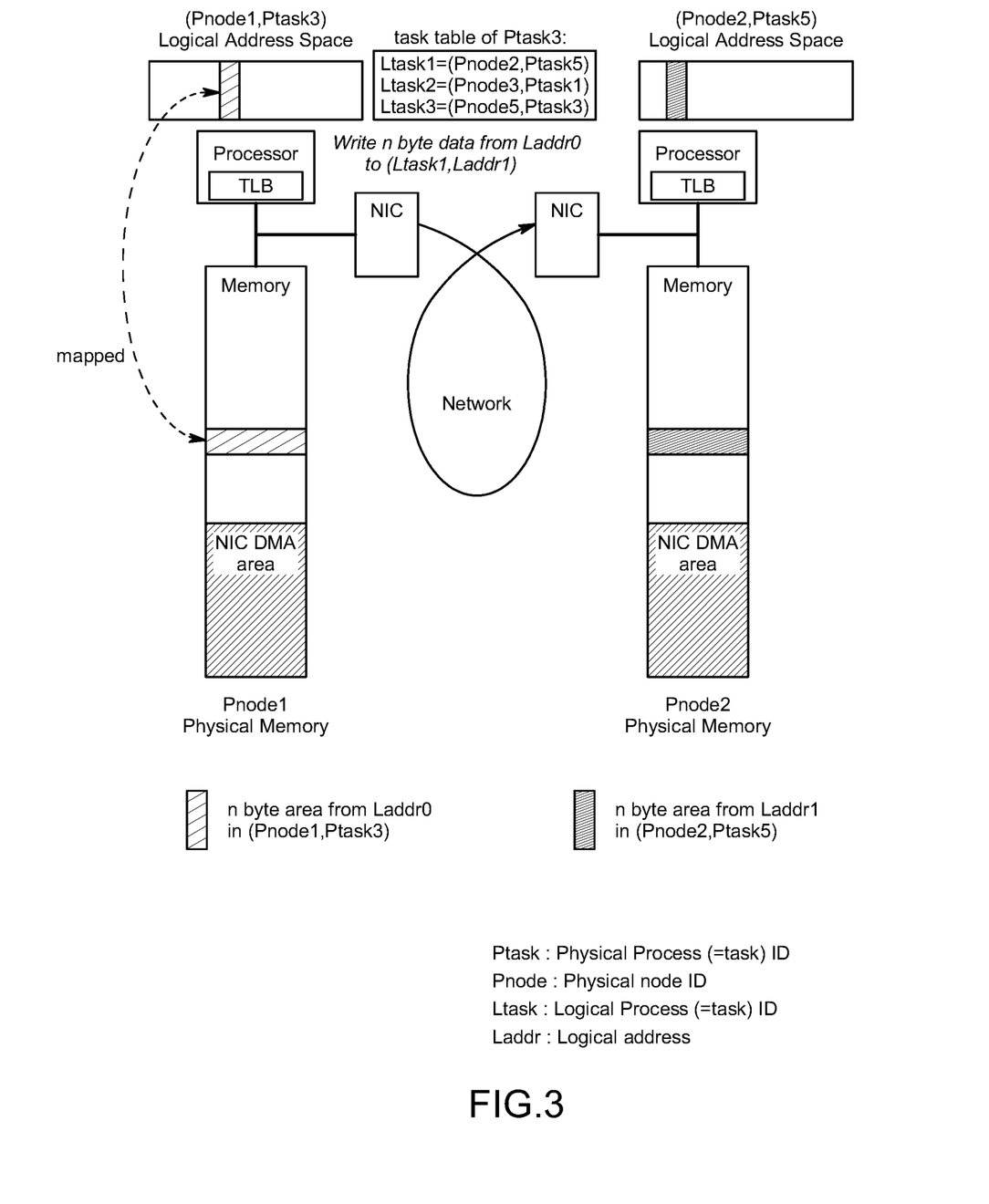
FIG. 3 is a schematic diagram illustrating a use environment of MBCF_WRITE of the embodiment.

FIG. 3 illustrates a use environment of MBCF_WRITE, in which Pnode1 is a transmission source node (transmission source computer) of the operation request packet, and Pnode2 is a reception-side node (transmission destination computer). The processor of the transmission source node creates a packet image including a header in which delivery information is written in a NIC DMA area of its own memory and a payload. The NIC DMA area memory can be directly accessed by the NIC for transmission or reception. When the generation of the packet image for transmission is completed, the processor instructs the NIC to start a transmission operation with DMA reading. The reception-side node (Pnode2) has a ring buffer for arrived packets in the NIC DMA area of its own memory. The NIC of the reception-side node determines whether the packet is a packet addressed to its own node (normally, the determination is made by the MAC address), and generates a copy of the packet addressed to its own node in the ring buffer. The NIC then generates a hardware interrupt to inform the processor of the reception-side node of the arrival of the packet.

Figure 4:
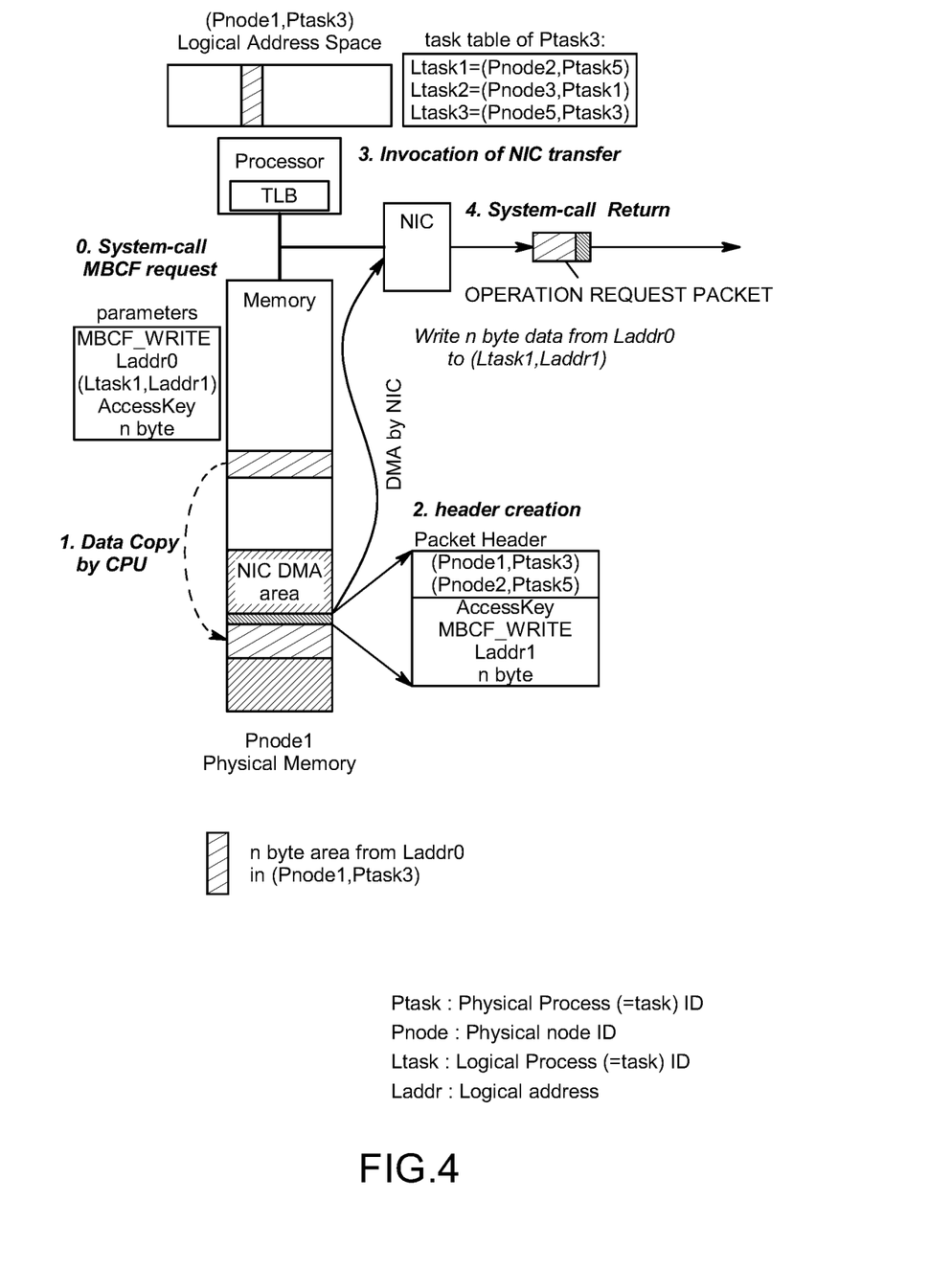
FIG. 4 is a schematic diagram illustrating an operation procedure of operation request packet transmission including a packet generation process on the operation request side according to the embodiment.

Next, with reference to FIG. 4, an operation procedure of operation request packet transmission including a packet generation process on the operation request side will be described.

In the transmission-side process (request side task), parameters including an identifier [Ltask1] of the reception-side process (request destination task), an operation target memory address [Laddr1] of the reception-side process, an access key [AccessKey] for memory space operation of the reception-side process, a command type [MBCF_WRITE] of the MBCF, a data size [n] for performing remote writing, and a pointer [Laddr0] to the head of an area storing data to be written are prepared. Then, the MBCF request transmission system call is called with these parameters. Upon receiving the system call, the OS refers to the task table of the transmission-side process and converts the logical task ID ([Ltask1]) indicating the reception-side process into a physical task ID [(Pnode2, Ptask5)]. Since the physical task ID includes Pnode2 which is a physical node ID, route information (delivery destination information) to the reception-side node can be set from this information. If the network to be used is Ethernet, the MAC address is used as the delivery destination information. This delivery destination information enables the NIC to deliver the operation request packet to the reception-side node. Then, the OS causes the NIC to transmit the operation request packet.

Next, with reference to FIGS. 5 and 6, a reception procedure of the operation request packet at the operation request destination will be described.

Figure 5:
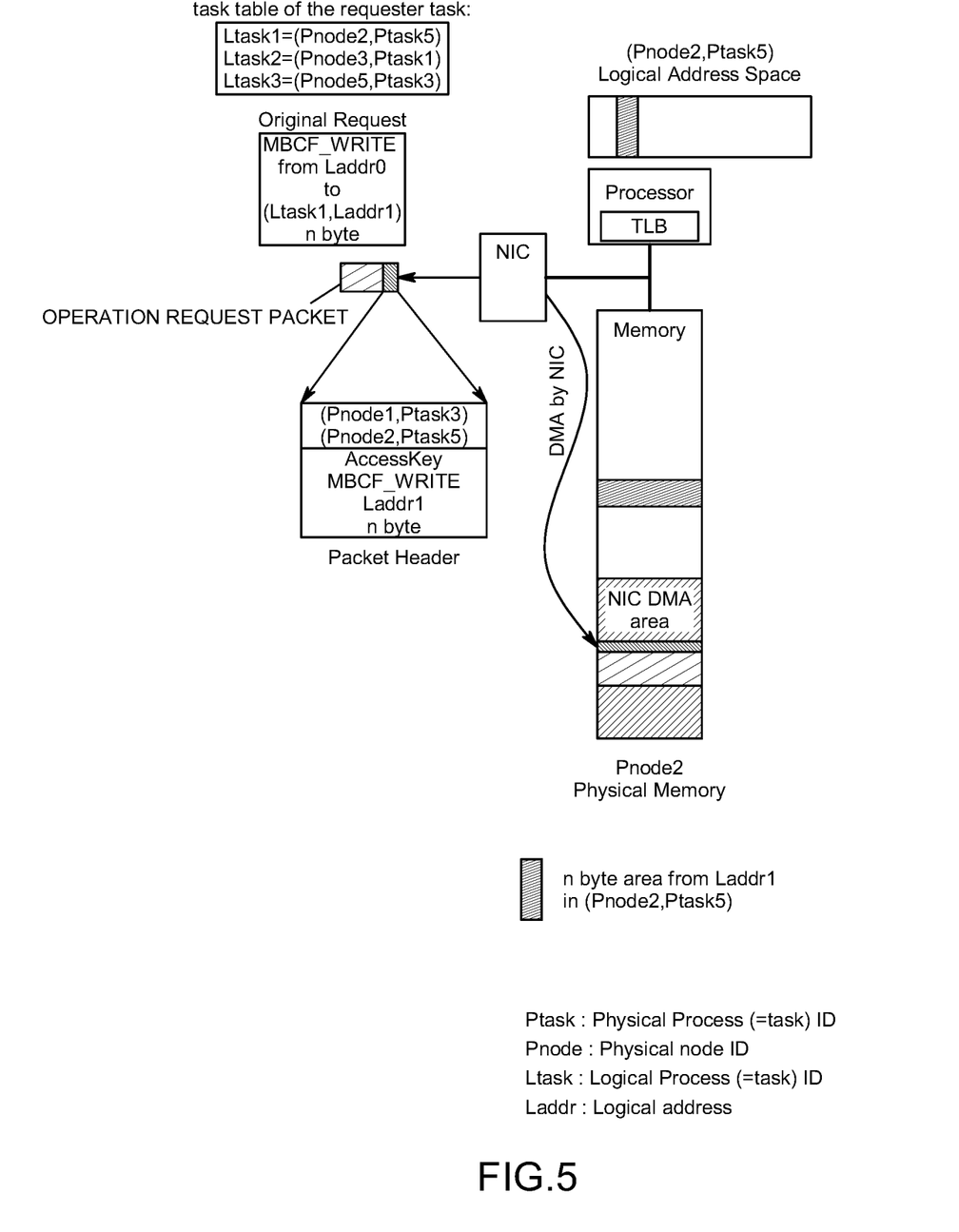
FIG. 5 is a schematic diagram illustrating a situation in which an operation request packet has arrived at a reception-side node according to the embodiment.

FIG. 5 illustrates a situation in which the operation request packet arrives at the reception-side node. The operation request packet is carried by the network to the reception-side node [Pnode2]. Upon packet arrival, the NIC of the reception-side node copies the data image of the operation request packet to the ring buffer by DMA, and then generates an interrupt signal to inform the processor of the reception-side node that the packet has arrived.

Figure 6:
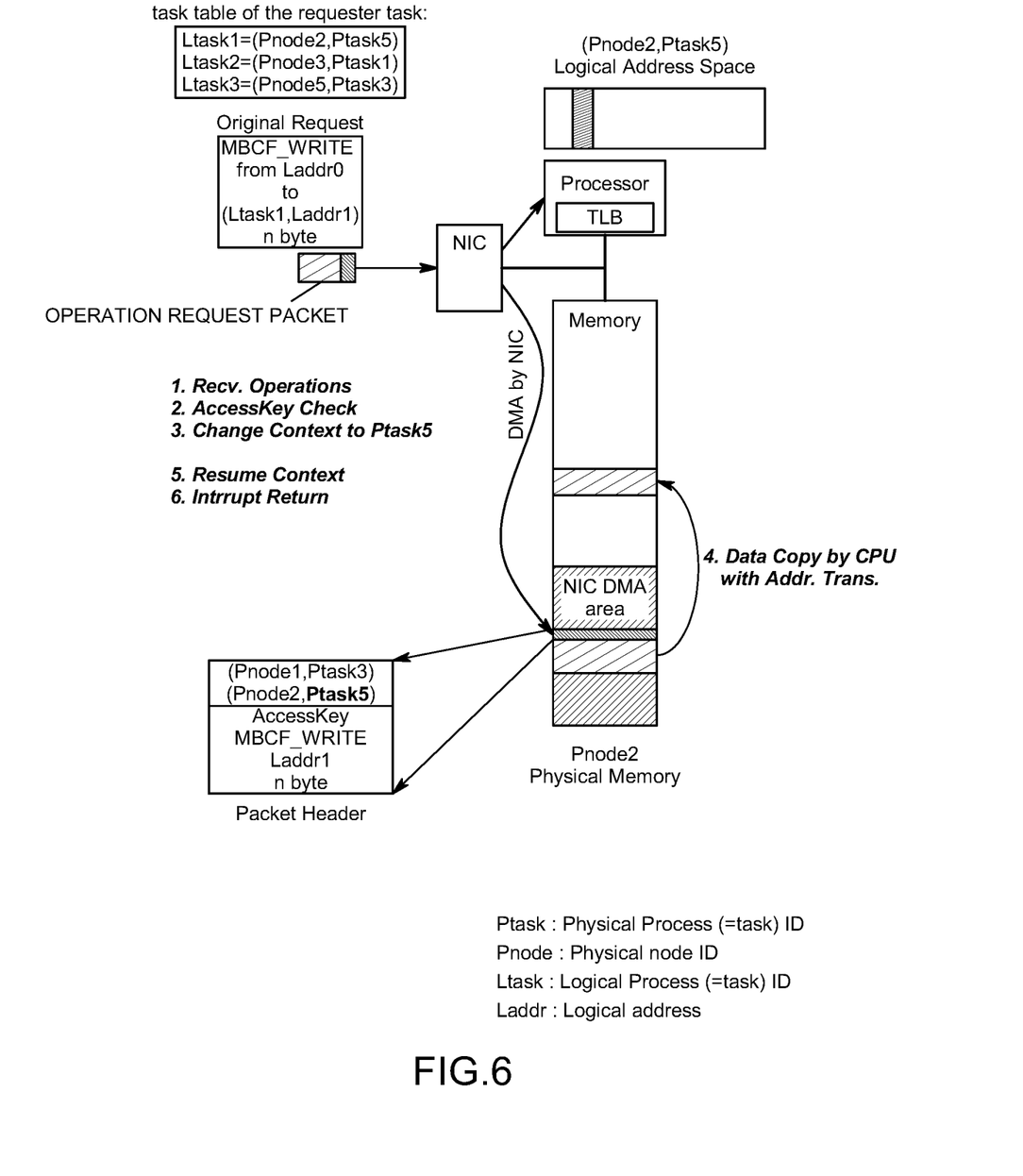
FIG. 6 is a schematic diagram illustrating MBCF-related processing in a packet reception interrupt routine in a reception-side node of the embodiment.

FIG. 6 illustrates MBCF-related processing in the packet reception interrupt routine in the reception-side node. Due to the occurrence of the reception interrupt from the NIC, the control of the processor of the reception-side node is switched to the packet reception routine, and the low-level packet reception procedure required by the NIC is executed first of all. In the packet reception routine, first, the reception-side process is specified from the physical task ID (Ptask5 in the drawing). Specifically, a pointer to a process structure of the process is obtained. Then, it is checked whether the AccessKey in the operation request packet matches that of the reception-side process, and only if there is a match, the memory operation in the memory space of the reception-side process is allowed. If there is a match, the context of the memory space is switched to that of the reception-side process, and the n-byte data carried in the operation request packet is written from the operation target logical address (Laddr1) by the store instruction of the user execution level instead of the privilege level. Then, the context of the memory space is restored to that at the time of occurrence of the interrupt. The processing in the interrupt routine is completed up to this point.

Figure 7:
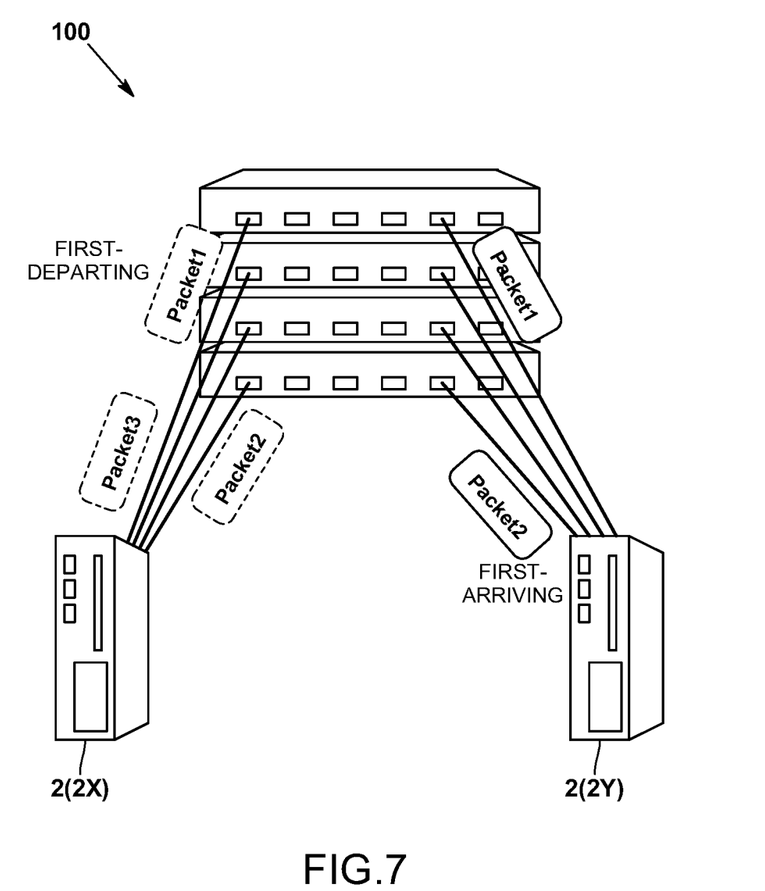
FIG. 7 is a schematic diagram illustrating a state in which the arrival order of operation request packets is disturbed.

Then, since the parallel and distributed computing system 100 of the present embodiment includes the plurality of data links 3, there is a problem that the arrival order of the operation request packets is disturbed as illustrated in FIG. 7. Thus, the parallel and distributed computing system 100 of the present exemplary embodiment has a function of guaranteeing the arrival order of the operation request packets to the reception-side process within the range intended by the user.

When the guarantee only within the range intended by the user is specifically that there are variables A, B, C, D, and F on the memory of the reception-side process, and the transmission-side process performs remote writing to each of A, B, C, and D with MBCF_WRITE, and finally writes a value (for example, 1) indicating that the writing is completed to F with MBCF_WRITE, order guarantee between MBCF_WRITE of A, B, C, and D is unnecessary, but order guarantee between MBCF_WRITE of A, B, C, and D and MBCF_WRITE of F is essential. Conversely, performing order guarantee among all MBCF_WRITE is an excessive guarantee, and may cause extra overhead. Therefore, in the present embodiment, synchronization information indicating that the writing of F is performed after all the MBCF operation request packets until the writing of D are processed is added only to the MBCF_WRITE request packet of F.

Figure 8:
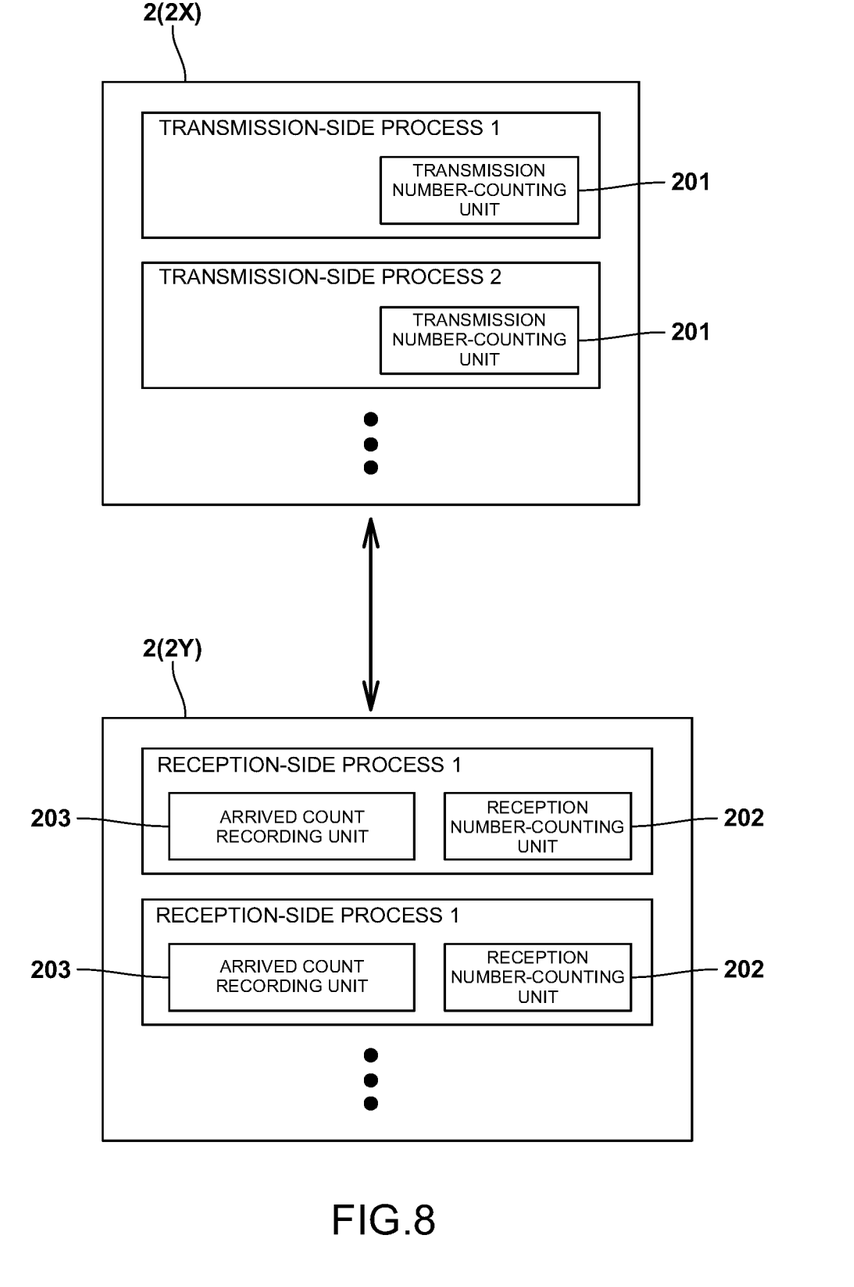
FIG. 8 is a functional block diagram of computers according to the embodiment.

As for the function of guaranteeing the arrival order of the operation request packets within the range intended by the user, specifically, as illustrated in FIG. 8, each transmission-side process of the transmission source computer 2 (2X) includes a transmission number-counting unit 201 that counts the number of transmission of the operation request packet for each reception-side process and attaches the count number before or after the counting-up of the operation request packet to the operation request packet. Each reception-side process of the transmission destination computer 2 (2Y) includes a reception number-counting unit 202 that counts the number of receptions of the operation request packet for each transmission-side process.

Then, in a case where the count number of the reception number-counting unit 202 and the count number attached to the operation request packet are consecutive, the transmission destination computer 2 (2Y) performs processing of the operation request packet and updates the count number of the reception number-counting unit 202 with the count number attached to the operation request packet.

Here, in a case where the arrival order at the reception-side process is disturbed and there is an unarrived operation request packet, the transmission destination computer 2 (2Y) updates the count number by the reception number-counting unit 202 only before the unarrived operation request packet. With respect to the arrival of an operation request packet after the unarrived operation request packet, when the following multi-link synchronization information is not added, the operation request packet is processed, and the count number attached to the operation request packet separately from the reception number-counting unit 202 is recorded in the arrived count recording unit 203.

Then, in a case where the recorded content of the arrival record at the reception-side process is consecutive from the reception number-counting unit 202 by using the arrived count recording unit 203 due to the arrival of the unarrived operation request packet, the transmission destination computer 2 (2Y) updates the reception number-counting unit 202 within the consecutive range, and deletes the updated record from the arrived count recording unit 203.

At this time, in a case where the transmission-side process wants to prohibit the operation request packet to be transmitted by the transmission-side process from being operated until the processing of an operation request packet preceding the operation request packet to be transmitted is completed, that is, in a case where the user (transmission-side process) wants to guarantee the arrival order, the transmission-side process adds a transmission number count of an operation request packet whose operation is desired to be reliably ended to the operation request packet as the multi-link synchronization information.

In a case where the operation request packet to which the multi-link synchronization information is added is received, the transmission destination computer 2 (2Y) refers to the reception number-counting unit 202 of the reception-side process, performs processing of the operation request packet when the count number described in the multi-link synchronization information is equal to or less than the count number of the reception number-counting unit 202, and performs updating work of the reception number-counting unit 202 and the arrived count recording unit 203.

In addition, in a case where the operation request packet to which the multi-link synchronization information is added is received, the transmission destination computer 2 (2Y) refers to the reception number-counting unit 202 of the reception-side process, delays the processing of the operation request packet until the count number of the reception number-counting unit 202 increases and becomes equal to or larger than the count number described in the multi-link synchronization information when the count number described in the multi-link synchronization information is larger than the count number of the reception number-counting unit 202, and also delays the updating work of the reception number-counting unit 202 and the arrived count recording unit 203.

Next, an example of a method of updating the count number of the reception number-counting unit 202 and the arrived count recording unit 203 using a bit vector will be described.

When the counter can be counted up in a state where there is no missing packet number in the bit vector, the counter and the bit vector are updated. A specific update method is as follows.

In a case where a 101st packet with the bit vector length of 8 bits is lost and 102nd and 103rd packets arrive, the value of the counter is 100, and the bit vector becomes 00000110 in binary. That is, the (102-100)-th bit and the (103-100)-th bit from the least significant bit are set to 1.

Here, when the 105th packet arrives, the value of the counter remains 100, and the bit vector becomes 00010110 in binary. That is, the (105-100)-th bit is set to 1.

In this state, when the 101st packet arrives, the (101-100)-th bit is set to 1, and the bit vector becomes 00010111 in binary. Since 1 is set to the rightmost bit, this means the arrival of consecutive packets to the value of the counter, and this bit vector is shifted to the right until the rightmost bit becomes zero, and the number of shifts is added to the counter.

That is, since the number of shifts is 3, the value of the counter becomes 103, and the bit vector becomes 00000010 in binary. Here, when the 104th packet arrives, the (104-103)-th bit is set to 1, the bit vector becomes 00000011 in binary, and as before, the value of the counter becomes 105 by adding 2 of consecutive 1 to the counter, and the bit vector becomes 00000000 in binary. The state in which the bit vector is all zero is a state in which there is no missing packet and the packet has arrived up to the value of the counter.

Alternatively, the following method may be used.

When it is assumed that the value of the counter is 105, the bit vector is 00000000 in binary, and a 106-th packet has arrived (no disturbance in order), the (106-105)-th bit of the bit vector is temporarily set to 1. At this time, since the value of the counter is 105, the bit vector becomes 00000001 in binary, and 1 is set in the rightmost bit of the bit vector, the bit vector is shifted to the right by 1 bit, the value of the counter becomes 106 by +1, and the bit vector becomes 00000000 in binary.

In this method, it is possible to perform processing in the same manner as the procedure in a case where there is a missing without including a procedure for confirming that there is no disturbance of order.

Note that, in the above description, an 8-bit bit vector is used, but when link aggregation with up to eight data links is assumed, there is no practical problem as long as the bit vector has about 32 bits. In a case where disturbance of order exceeding the bit width of the bit vector has occurred, the packet having the number exceeding the bit width of the bit vector is rejected and is to be retransmitted.

Figure 9:
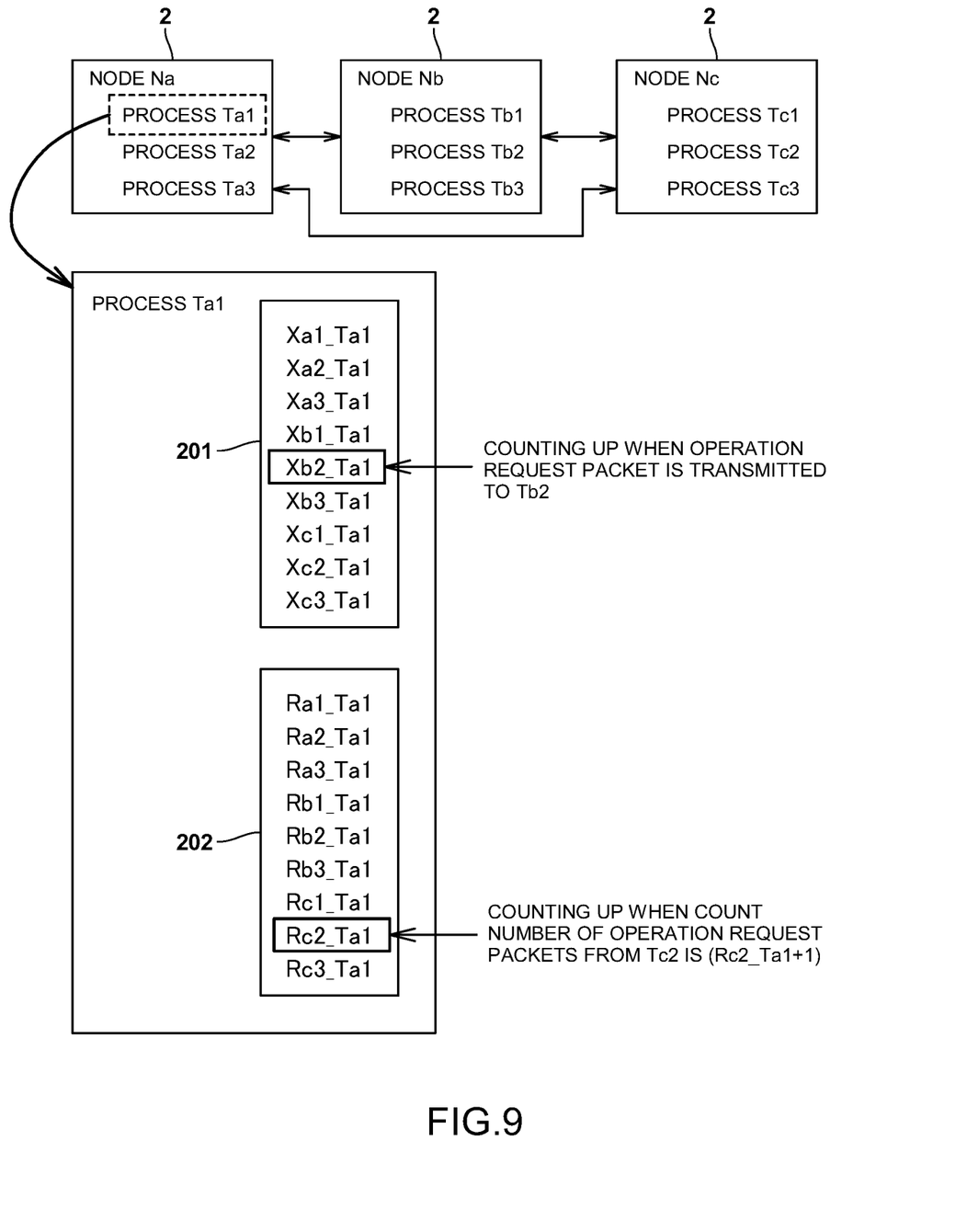
FIG. 9 is a schematic diagram illustrating a transmission number-counting unit and a reception number-counting unit of a node Na as a representative of nodes Na, Nb, and Nc.

Next, as illustrated in FIG. 9, let three computers 2 be nodes Na, Nb, and Nc, and suppose that there are three processes (also referred to as tasks) for each node such as
processes Ta1, Ta2, and Ta3 for the node Na,
processes Tb1, Tb2, and Tb3 for the node Nb,
processes Tc1, Tc2, and Tc3 for the node Nc,
and they are performing communication and/or synchronization by MBCF with each other. Note that the transmission-side process can perform a memory operation request to another process including itself or a process in the same computer as a part of the remote memory operation using the MBCF.

In this case, in the process Ta1, there are nine transmission number counters Xa1_Ta1, Xa2_Ta1, Xa3_Ta1, Xb1_Ta1, Xb2_Ta1, Xb3_Ta1, Xc1_Ta1, Xc2_Ta1, and Xc3_Ta1 in the transmission number-counting unit 201 (transmission number counter) corresponding to the processes Ta1, Ta2, Ta3, Tb1, Tb2, Tb3, Tc1, Tc2, and Tc3. Here, it is assumed that the order is controlled for the own process or the process of the same node. Note that, in these, since the disturbance of the packet arrival order is not assumed, the order control can be omitted, but the user or the programmer needs to be aware of whether or not the reception-side process of the communication partner exists in the same computer, which increases the degree of difficulty in program creation. Therefore, the system is configured to use the MBCF operation request packet including the transmission number count and the multi-link synchronization information of the same specification regardless of in which computer the reception-side process exists.

Then, for example, in a case where the process Ta1 issues an operation request packet toward the process Tb2, the transmission number counter Xb2_Ta1 is counted up. Similarly, there are nine transmission number counters in each of the other processes.

In the process Ta1, there are nine reception number counters Ra1_Ta1, Ra2_Ta1, Ra3_Ta1, Rb1_Ta1, Rb2_Ta1, Rb3_Ta1, Rc1_Ta1, Rc2_Ta1, and Rc3_Ta1 in the reception number-counting unit 202 (reception number counter) corresponding to the processes Ta1, Ta2, Ta3, Tb1, Tb2, Tb3, Tc1, Tc2, and Tc3.

Then, for example, when the node Na receives an operation request packet addressed to the process Ta1 from the process Tc2 and the count value in the operation request packet is (Rc2_Ta1+1), the reception number counter Rc2_Ta1 is counted up after the memory operation. When the count value in the operation request packet is larger than (Rc2_Ta1+1), the count value is recorded in the arrived count recording unit 203 (configured using a bit vector) corresponding to the reception number counter Rc2_Ta1 after the memory operation, and the counting-up of the reception number counter Rc2_Ta1 is delayed until the memory operation of the overtaken operation request packet is ended.

In a case where the multi-link synchronization information (synchronization option) is added to the operation request packet from the process Tc2 to the process Ta1, when the value of the reception number counter Rc2_Ta1 is equal to or greater than the count value described in the synchronization option, the same process as the operation request packet without the synchronization option is performed.

On the other hand, in a case where the value of the reception number counter Rc2_Ta1 is smaller than the count value described in the synchronization option, the execution including the memory operation and the registration in the arrived count recording unit (bit vector) is delayed until the value of the reception number counter Rc2_Ta1 becomes equal to or larger than the count value described in the synchronization option.

<2. Effects of Present Embodiment>

According to the parallel and distributed computing system 100 of the present embodiment configured as described above, in a case where a plurality of computers 2 are interconnected via a plurality of data links 3, and the plurality of computers 2 perform communication and/or synchronization by MBCF with each other, a transmission-side process includes a transmission number-counting unit 201 that attaches a count number before or after counting-up of an operation request packet to the operation request packet, a reception-side process includes a reception number-counting unit 202 that counts the number of reception of the operation request packet for each transmission-side process, and a transmission destination computer 2 (2Y) performs processing of the operation request packet when a count number of the reception number-counting unit 202 and the count number attached to the operation request packet are consecutive, and updates the count number of the reception number-counting unit 202 by the count number attached to the operation request packet. Thus, under an environment in which the arrival order of the operation request packets is disturbed, the memory operation order can be guaranteed within the range intended by the user, that is, the memory consistency can be maintained.

Conventionally, in a distributed shared memory type parallel computer that allows shared memory access to distributedly arranged memories, in order to guarantee an operation order of the memories, an acknowledgement response (Acknowledgement, hereinafter Ack) is returned to a request source for all remote memory operations, and in a case where the order must be guaranteed, a request for a remote memory operation to guarantee the order is made after confirming that Acks for all the remote memory operations so far have returned. This order guarantee mechanism is called a memory barrier. On the other hand, in the present invention, the Ack of the remote memory operation is not required for the order guarantee, and the request for the remote memory operation to guarantee the order can be made following the most recently requested remote memory operation. This means that it is not necessary to wait for the Ack of the preceding remote memory operation to return, allowing for a significant performance improvement. Further, the transmission-side process can add the multi-link synchronization information by using the value of the transmission number-counting unit 201 held by the transmission-side process itself, and the transmission destination computer 2 (2Y) can determine whether the synchronization is established or not by using the value of the reception number-counting unit 202 belonging to the reception-side process in the same computer. That is, both the transmission-side process and the transmission destination computer 2 (2Y) can obtain information necessary for synchronization at extremely low cost.

Figure 10:
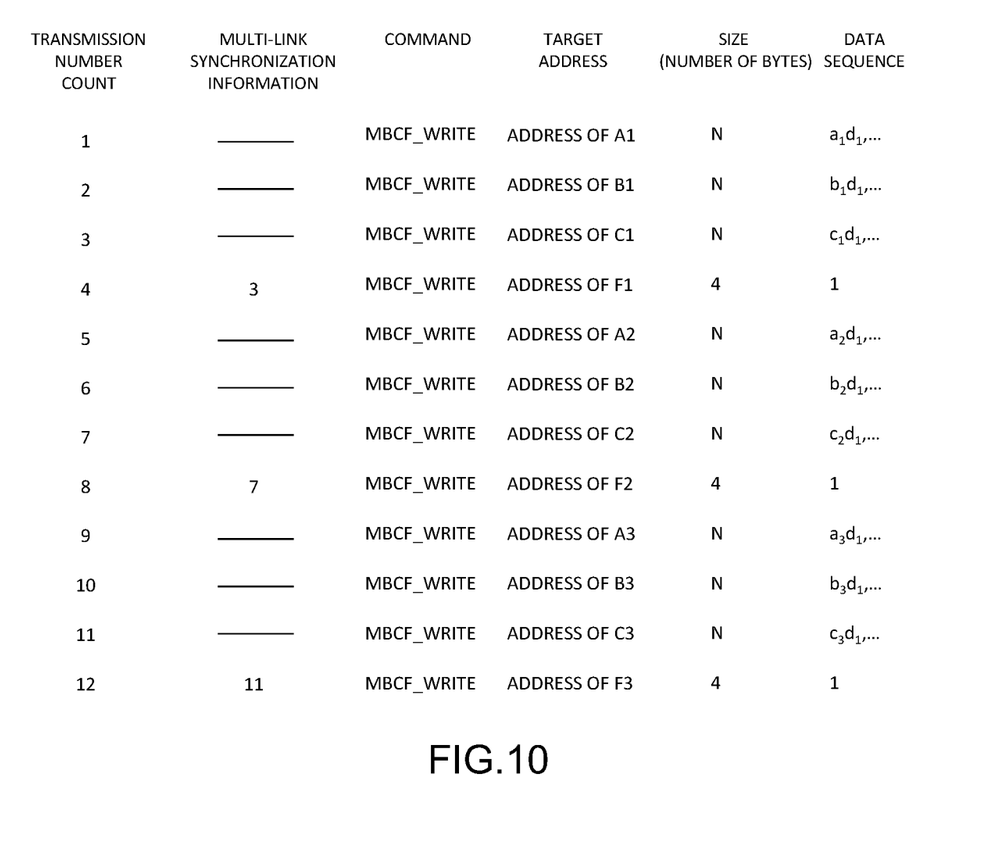
FIG. 10 is a usage example 1 of a remote memory operation into which synchronization information is inserted according to the embodiment.
Figure 11:
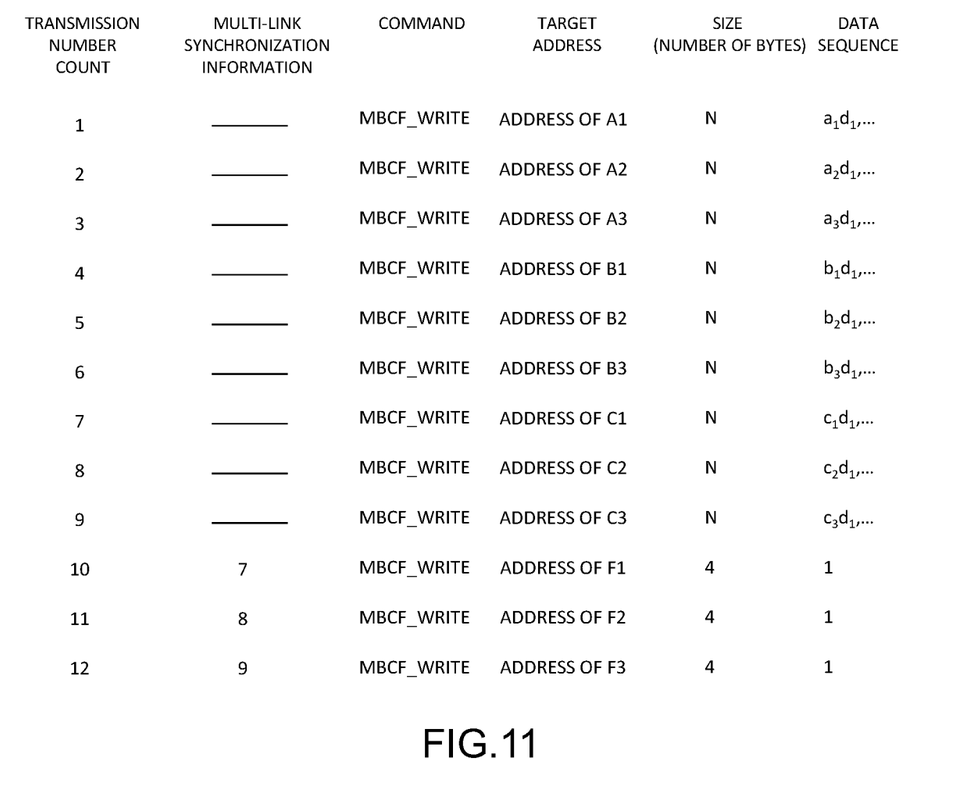
FIG. 11 is a usage example 2 of a remote memory operation into which synchronization information is inserted according to the embodiment.

By using the present invention, it is possible to reduce overhead costs due to synchronization more than there is no need to wait for Ack. The possibility will be described with a specific example. In the reception-side process, there are memory areas A1, B1, and C1, and there is a flag variable F1 indicating that the value storage to A1, B1, and C1 has been completed. Similarly, there are memory areas A2, B2, C2, A3, B3, and C3 in the same reception-side process, and there is a flag variable F2 indicating that the value storage to A2, B2, and C2 has ended, and a flag variable F3 indicating that the value storage to A3, B3, and C3 has ended. It is assumed that the value storage to all memory areas and flags is remotely written by MBCF_WRITE. There is an order relation to be observed between the remote writing of A1, B1, and C1 and F1, A2, B2, and C2 and F2, and A3, B3, and C3 and F3, but there is no order relation between An, Bn, and Cn, or between Fm and Fn (where m≠n). When the MBCF_WRITE request packet is simply issued as illustrated in FIG. 10, it is necessary to guarantee that the writing to F1, F2, and F3 is performed after the writing to the immediately preceding C1, C2, and C3 is performed. In the presence of a plurality of links, it is not guaranteed that the requests are delivered in the order in which the requests are issued. Therefore, there is a significant possibility that the operation request packet processing has to be delayed for synchronization in the transmission destination computer 2 (2Y). On the other hand, as illustrated in FIG. 11, by increasing the distance between the writing to the memory area in which the order should be guaranteed and the writing to the flag variable by interposing irrelevant MBCF_WRITE therebetween, the count value of the link synchronization information to be added is not the value of the transmission number-counting unit 201 of the MBCF request count issued immediately before but the value of the transmission number-counting unit 201 three packets before. This means that the arrival of the request packet to the transmission destination computer 2 (2Y) can be earlier than the preceding two packets. Clearly in the case of FIG. 11, it is less likely that the writing to the flag variable is delayed in the transmission destination computer 2 (2Y) due to the synchronization waiting than in the case of FIG. 10. That is, by using the present invention and optimizing an order of issuing operation requests that require synchronization and operation requests that do not require synchronization, and operation requests that have no order relation, it is possible to further reduce overhead costs of synchronization.

In addition, the present invention is not limited to the above embodiment, and it goes without saying that various modifications can be made without departing from the gist of the present invention.

INDUSTRIAL APPLICABILITY

According to the present invention, in a parallel and distributed computing system in which a plurality of computers are interconnected via a plurality of data links and the plurality of computers perform communication synchronization by MBCF with each other, it is possible to achieve memory consistency at low cost in a situation where there is a disturbance in the arrival order of packets.

The invention claimed is:

1. A parallel and distributed computing system comprising:
a plurality of computers, including a processor having a translation lookaside buffer (TLB), a physical memory, and a network interface controller (NIC) directly accessible to the physical memory, interconnected via a plurality of data links, wherein
a process of a transmission source computer (hereinafter, a transmission-side process) of the plurality of computers transmits an operation request packet including an identifier of an operation target process (hereinafter, a reception-side process) that specifies a process of a transmission destination computer of the plurality of computers, an operation target address that specifies a memory area of the reception-side process, a data size to be written, and a data sequence,
the transmission destination computer receives the operation request packet and stores the data sequence in the memory area specified by the reception-side process and the operation target address,
the transmission-side process includes a transmission number-counting unit that counts a number of transmission of the operation request packet for each reception-side process and attaches a count number before or after counting-up of the operation request packet to the operation request packet,
the reception-side process includes a reception number-counting unit that counts a number of receptions of the operation request packet for each transmission-side process,
the transmission destination computer performs processing of the operation request packet when a count number of the reception number-counting unit and the count number attached to the operation request packet are consecutive and updates the count number of the reception number-counting unit by the count number attached to the operation request packet,
in a case where an arrival order at the reception-side process is disturbed and there is an unarrived operation request packet, the transmission destination computer updates the count number by the reception number-counting unit only before the unarrived operation request packet, performs processing of the operation request packet with respect to arrival of an operation request packet after the unarrived operation request packet, and records the count number attached to the operation request packet separately from the reception number-counting unit in an arrived count recording unit, and
in a case where a recorded content of arrival record at the reception-side process is consecutive from the reception number-counting unit by using the arrived count recording unit due to arrival of the unarrived operation request packet, the transmission destination computer updates the reception number-counting unit within a consecutive range, and deletes an updated record from the arrived count recording unit.

2. The parallel and distributed computing system according to claim 1, wherein in a case where the transmission-side process wants to prohibit the operation request packet to be transmitted by the transmission-side process from being operated until processing of an operation request packet preceding the operation request packet to be transmitted is completed, the transmission-side process adds a transmission number count of an operation request packet whose operation is desired to be reliably ended to the operation request packet as multi-link synchronization information.

3. The parallel and distributed computing system according to claim 2, wherein in a case where the operation request packet to which the multi-link synchronization information is added is received, the transmission destination computer refers to the reception number-counting unit of the reception-side process, performs processing of the operation request packet when a count number described in the multi-link synchronization information is equal to or less than the count number of the reception number-counting unit, and performs updating work of the reception number-counting unit and the arrived count recording unit.

4. The parallel and distributed computing system according to claim 3, wherein in a case where the operation request packet to which the multi-link synchronization information is added is received, the transmission destination computer refers to the reception number-counting unit of the reception-side process, delays processing of the operation request packet until the count number of the reception number-counting unit increases and becomes equal to or larger than the count number described in the multi-link synchronization information when the count number described in the multi-link synchronization information is larger than the count number of the reception number-counting unit, and also delays the updating work of the reception number-counting unit and the arrived count recording unit.

* * * * *